(12) United States Patent
Brennesholtz

(10) Patent No.: US 6,285,415 B1
(45) Date of Patent: Sep. 4, 2001

(54) METHOD FOR COLOR CORRECTION OF FIELD SEQUENTIAL LIGHT VALVE PROJECTORS WITH LINE-AT-A-TIME ADDRESSING

(75) Inventor: Matthew Scott Brennesholtz, Pleasantville, NY (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/177,014

(22) Filed: Oct. 22, 1998

(51) Int. Cl.$^7$ .................................................. H04N 9/12
(52) U.S. Cl. ............................................. 348/742; 348/656
(58) Field of Search ........................................ 348/743, 742, 348/655, 656, 657, 658, 771, 68, 69, 70, 760; H04N 9/12, 9/73

(56) References Cited

U.S. PATENT DOCUMENTS 5,680,180 * 10/1997 Huang .................................. 348/656
5,917,558 * 6/1999 Stanton ................................ 348/743
6,108,053 * 8/2000 Pettitt et al. ......................... 348/743

\* cited by examiner

*Primary Examiner*—Michael Lee

(57) ABSTRACT

In a single panel scrolling raster projection system of the type having a single light source, a single light valve panel, a rotatable element having surface segments for separating the white light into color bands, and field-sequential, line-at-a-time addressing means, one or more of the color bands is sized to have a height in the scrolling direction greater than the height of the panel in the scrolling direction, and sizing the remaining bands to have a scrolling height substantially equal to that of the panel. Color correction is achieved by changing the power of the light source to increase or decrease its illumination during the period in which the panel is substantially entirely illuminated by a color band having a scrolling height greater than that of the panel, and/or by adjusting the scrolling heights of the color bands relative to one another.

16 Claims, 3 Drawing Sheets

METHOD FOR COLOR CORRECTION OF FIELD SEQUENTIAL LIGHT VALVE PROJECTORS WITH LINE-AT-A-TIME ADDRESSING

This invention was made with United States Government support under award 70NANB5H1070, entitled "High Information Content Display Technology", awarded by the Department of Commerce through its National Institute of Science & Technology (NIST).

BACKGROUND OF THE INVENTION

This invention relates to field sequential light valve projection display systems, and more particularly relates to such systems in which the display panel is addressed one line at a time.

Light valve projectors generally achieve a full color display by first breaking white light into red, green and blue components. These color components are then modulated by one or more light valves in accordance with the red, green and blue components of the color display signal. The display signal components are divided into fields of information, in the manner of video broadcast signals, and, in the case of a single light valve projector, the red, green and blue fields are sequentially applied to the light valve. The RGB cycle repeats at a frequency to give a viewer the impression of a steady, flicker-free image, for instance, 60 Hz for USA television.

A typical light valve is a two-dimensional matrix of individually-addressable pixel elements, and the most common method of loading a field of information onto the light valve, the so-called "line-at-a-time" method, is to address the matrix one row or line of pixels at a time. (In the less common "field-at-a-time" method, the data for an entire field is loaded into a "shadow RAM" and then transferred to the entire matrix of pixels at one time). In the line-at-a-time scheme, as soon as data is loaded into a row or line of pixels, the data affects the display. The drive electronics then select the next line for addressing, which is generally immediately adjacent to the previously-addressed line.

If each pixel of the light valve is driven to its maximum transmission (or reflection) state for each of the three colors, a solid white field of the maximum brightness the projector is capable of achieving will be displayed at the viewing screen. For any given application, there is a target white value, which can be represented as a point on the CIE chromaticity diagram. For instance, for consumer television in the USA and Europe, the target point is D65 white (corresponding to CIE color coordinates of x=0.313, y=0.329). If the white achieved by the maximum drive for all three colors matches this target value, no color correction is necessary. However, in practice, the light source will generally be found to be deficient in one or more colors, and some color correction will be required.

The simplest way to achieve color correction is to discard the light that is in excess. For one type of high intensity discharge lamp which is red-deficient, it would then be necessary to discard some blue and green to achieve the correct color balance. Discarding blue has little effect on the lumen throughput, but discarding green can have a dramatic effect. Sometimes, depending on projector design, it may be necessary to discard almost half of the green light. This can reduce lumen throughput sufficiently to render the projector non-competitive.

In one type of field-sequential, line-at-a-time color projection system, described in commonly assigned U.S. Pat. No. 5,532,763, white light from a source is divided into three color components or subbeams having band-shaped cross-sections. These subbeams are scrolled sequentially across the light valve, eg, an LCD panel, while those portions of the panel which are illuminated by the bands are synchronously addressed with the corresponding display signal information. Such projection systems are referred to herein as single panel scrolling raster (SPSR) projectors.

A virtue of the SPSR projector is that it is possible to make the height and spacing of the subbands sufficiently small that two or even three of the subbands are present on the panel at the same time. Thus, the efficiency of such a projector can be two or three times that of prior field sequential projectors in which only one color, or one third of the total light, can be present on the panel at one time.

One way of achieving color correction in such a SPSR system, described in commonly assigned U.S. Pat. No. 5,548,347, is to increase the light throughput of the color that is deficient while simultaneously decreasing the throughput of the color that is excessive, by changing the band dimension in the scrolling direction, ie, increasing the band for the deficient color and decreasing the band for the excessive color.

A different type of SPSR color projection system is described and claimed in commonly assigned U.S. patent application Ser. No. 09/127003, filed Jul. 31, 1998, the entire specification of which is incorporated herein by reference. In this projector, white light from a source is incident on a single rotationally-symmetric element such as a drum, having reflective surface portions with different color reflection bands. The surface portions separate the white light into the desired color bands and reflect the bands into a relay lens, which images the bands onto the light modulator panel, while the rotation of the drum causes the color bands to scroll across the panel in the desired manner.

Such a projection system eliminates the need to form the white light into subbands prior to scrolling, and thus makes possible a smaller and less expensive light valve panel, and correspondingly smaller and less expensive optical components.

OBJECTS AND SUMMARY OF THE INVENTION

It is an object of the invention to provide a method of color correction for a SPSR projector of type in which white light is separated into color band by a rotating element, and in which line-at-a-time addressing proceeds from one line to the next immediately adjacent line.

In accordance with the invention, a single panel scrolling raster projection system of the type having a single light source, a single light valve panel, an element for separating the light from the source into rotating color bands, and field-sequential, line-at-a-time addressing means, one or more of the color bands is sized to have a height in the scrolling direction greater than the height of the panel in the scrolling direction, and sizing the remaining bands to have a scrolling height substantially equal to that of the panel. Color correction is achieved by changing the power of the light source to increase or decrease its illumination during the period in which the panel is substantially entirely illuminated by a color band having a scrolling height greater than that of the panel, and/or by adjusting the scrolling heights of the color bands relative to one another.

More specifically, a method of color correction is provided for a single panel scrolling raster color projection system, the system having a single white light source, a single light valve panel, a rotatable element for separating the white light into two or more color bands, and a field-sequential, line-at-a-time addressing system. The method comprises the step of:

(a) setting the height in the scrolling direction of at least one of the color band(s) to be greater than the height of the panel in the scrolling direction, and setting the height of the remaining color bands to be at least substantially the same as the height of panel in the scrolling direction, so that the panel is substantially entirely illuminated by each color band at some instant of time during scrolling;

(b) changing the power to the light source to increase or decrease the lumen output of the light source during the time period in which the panel is substantially entirely illuminated by a color band, thereby to increase or decrease the contribution of the color of the color band to the total lumen output of the system; and/or (c) adjusting the heights in the scrolling direction of one or more of the color band(s) relative to the other color band(s), thereby to increase or decrease the contribution of the color of the changed color band(s) to the total lumen output of the system.

Preferably, the system utilizes a rotatable reflective color drum as the color separation element, and a reflective LCD as the light valve panel. If desired, color purity can be safeguarded by introducing a small gap between the adjacent color bands.

BRIEF DESCRIPTION OF THE DRAWINGS

The invention will now be described in terms of a limited number of preferred embodiments, with reference to the drawings, in which.

The same reference numerals are used in the figures to denote the same or similar elements.

DESCRIPTION OF THE PREFERRED EMBODIMENTS

The invention will be described in terms of an active matrix LCD, in which each pixel in the matrix has an associated switch, although it should be understood that the method can be applied to any transmissive or reflective light valve in a SPSR color projection system employing a rotating element to separate white light into color bands, and line-at-a-time addressing in a line-sequential manner.

Figure 1:
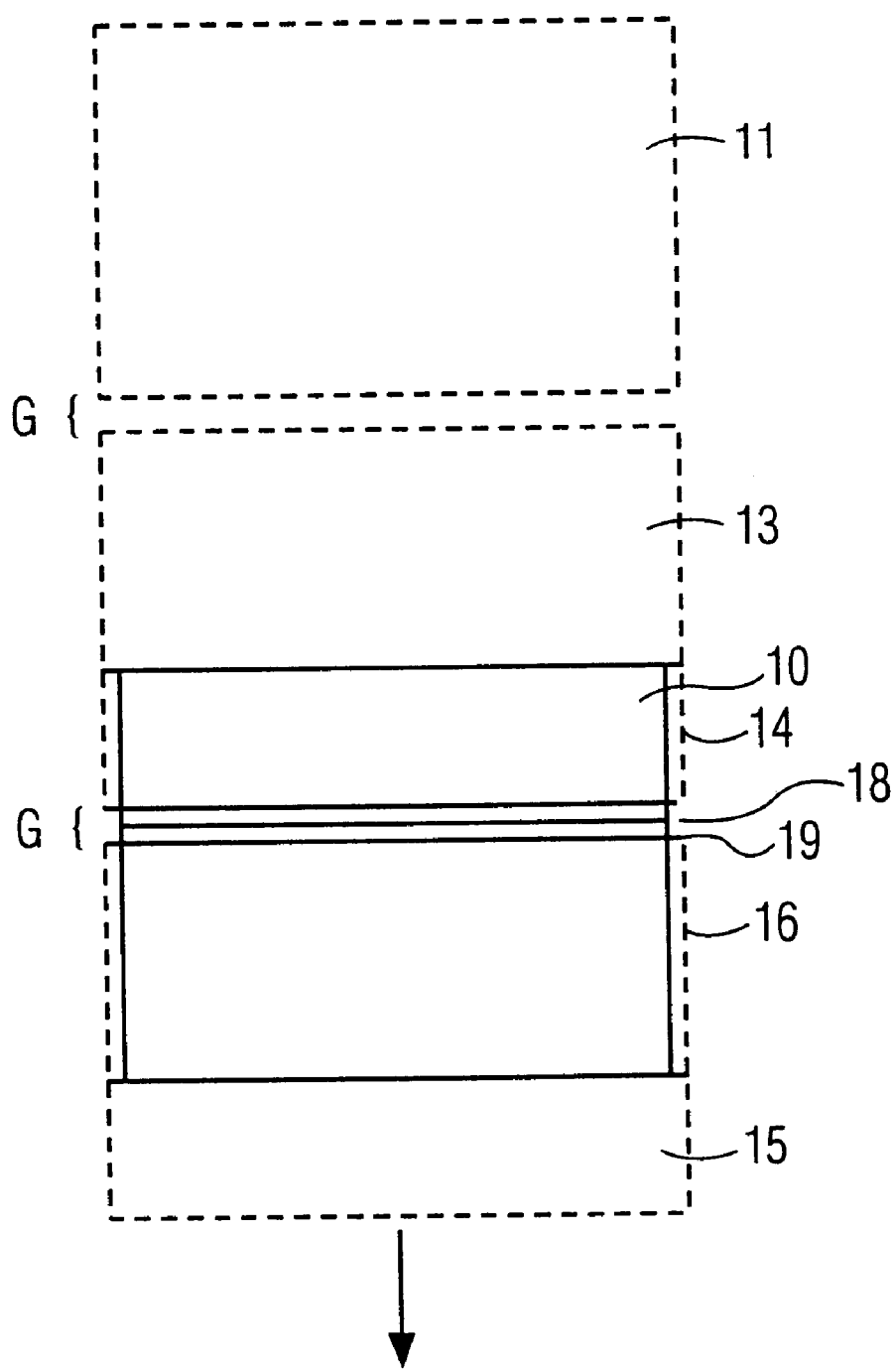
FIG. 1 is a schematic diagram illustrating the prior art scheme of illuminating and addressing a light valve in a SPSR projector.

In FIG. 1, horizontally divided green, red and blue color bands (11, 13, 15) are shown moving in the direction of the arrow to scroll across panel 10. The moving color bands are produced, for example, by a transmissive or reflective rotating mechanical element such as a color drum or a spiral color wheel, or by a stationary element composed of color filters operated electronically.

At the instant of time t shown, LCD panel 10 is being partially illuminated by segment 14 of the red band 13 and segment 16 of the blue band 15. Line 18, located in the horizontal space or gap g between the red band 13 and the blue band 15, and thus the next line to be illuminated by the scrolling red band 13, is being addressed with red data, while the immediately adjacent line 19 and subsequent lines contain blue data from the previous color field. After the red data is loaded into line 18, line 19 and subsequent lines will be addressed with red data and so on until the last line is reached. As the red band 13 leaves the panel 10, the green band 11 approaches the panel 10, and addressing with green data begins with the first line, and so on.

In a color sequential system, each RGB cycle must be completed in one field time. All of the lines must be addressed three times in this field time, once for each color. For example, for a 480 line display operating at 60 Hz (corresponding to an NTSC television signal), the field time is 16.7 mS, and the maximum allowable time to address each line is 11.6 uS. In the prior art scheme illustrated, there is no pause in the addressing between color bands, thus maximizing the amount of time available for addressing and minimizing the clock rates in the drive electronics.

Figure 2:
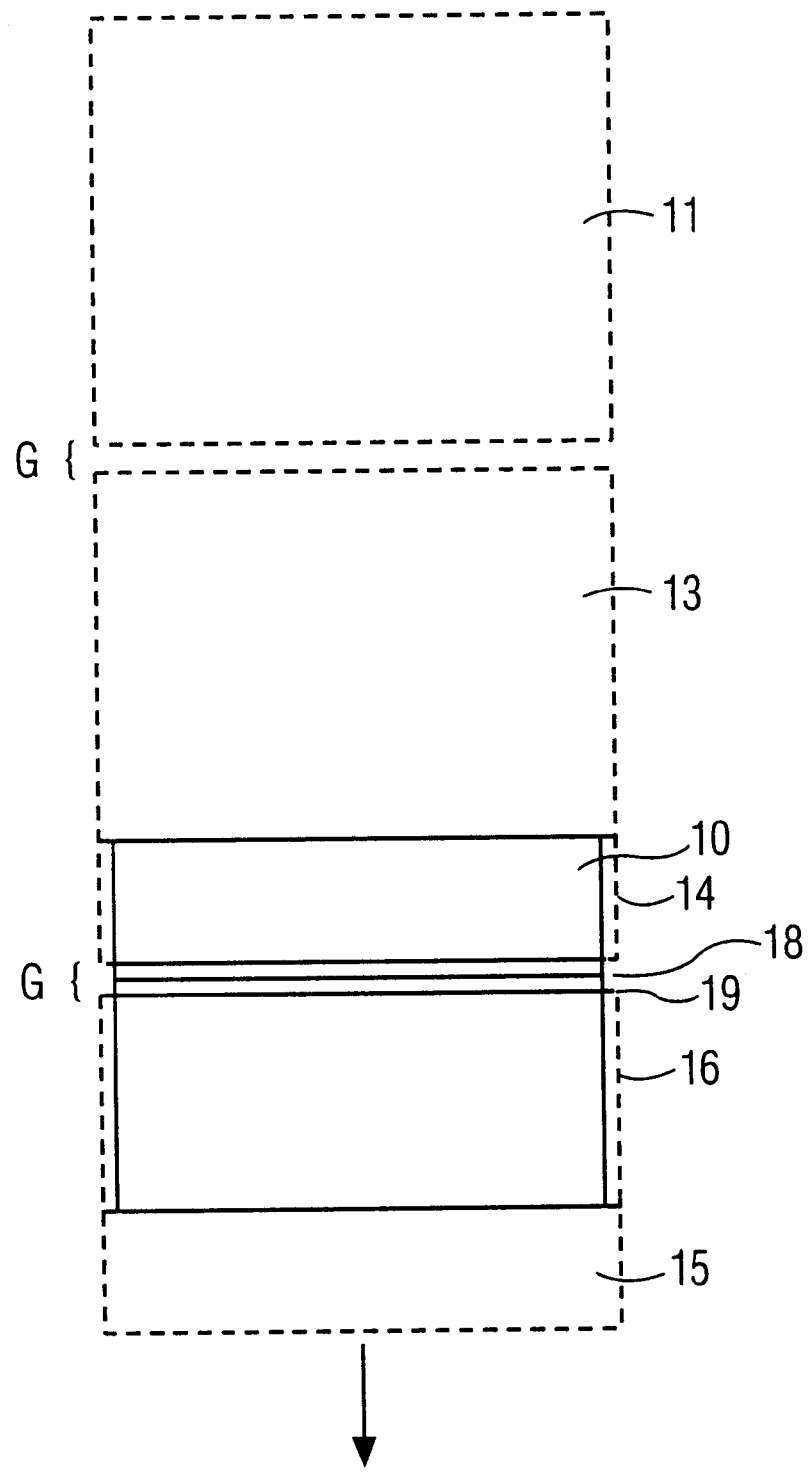
FIG. 2 is a schematic diagram similar to that of FIG. 1, except the color bands are of unequal height.

FIG. 2 shows a similar arrangement to that of FIG. 1, except that the heights of the color bands are unequal, adjusted to achieve balancing between the colors. Thus, the heights of the green and red bands (11, 13), which are deficient in the light source, have been increased, without decreasing the height of the blue band 15. In the color drum, the blue and green segments must be reduced in order to accommodate the larger red segment, but the magnification of the relay optics can then be adjusted so that the height of the blue band matches the height of the LCD panel.

In a non-color corrected color drum system in which there are two RGB cycles around the 360 degrees of drum surface, each color segment occupies 60 degrees of the surface. As an example of unequal segment sizes to achieve color correction, allocate 75 degrees to red, 55 degrees to green and 50 degrees to blue. The heights of the bands in FIG. 2 are proportional to this allocation, with the blue band being of sufficient height to substantially entirely cover LCD panel 10.

Since the entire RGB addressing cycle must be completed in 16.7 mS, the speed of rotation of the drum must remain the same, so that the time now available for addressing the blue segment is reduced from 11.6 to 9.7 uS (50 degrees*16.7 mS/180 degrees*480 lines).

Figure 3:
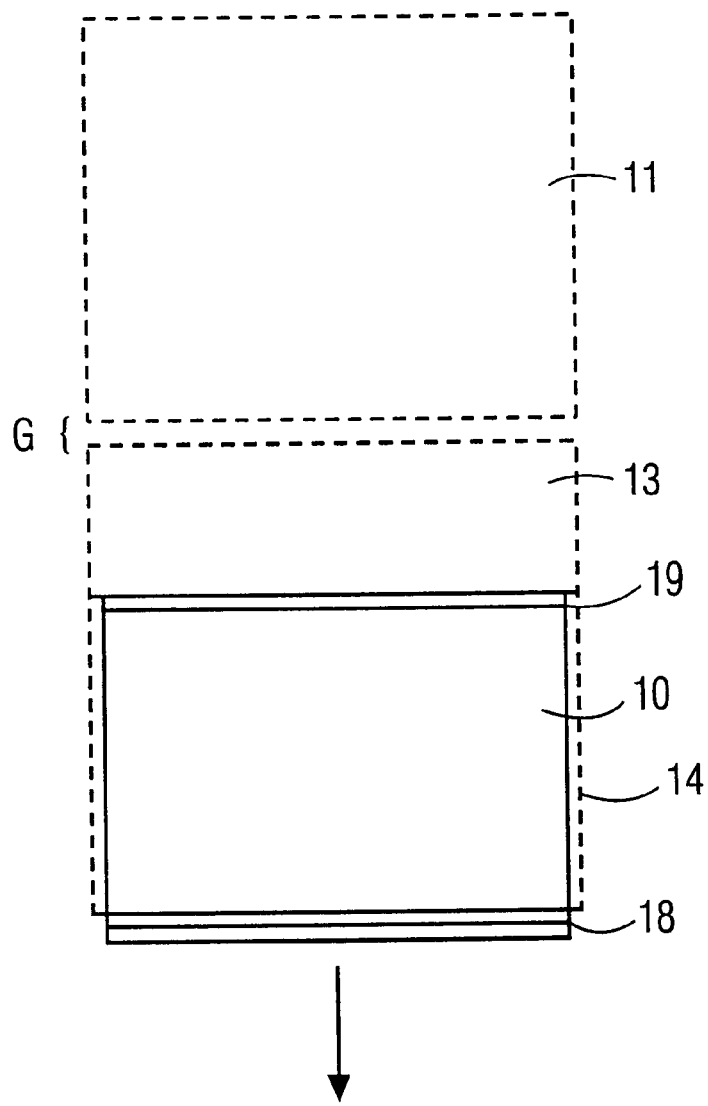
FIG. 3 is a schematic diagram similar to that of FIG. 2, in which the light valve panel is shown substantially entirely illuminated by one color.

Because the height of the red and green bands is larger than that of the blue band, addressing of the red and green data will be completed before the end of the corresponding color band is reached. Thus, there will be a pause before addressing of the next color begins. In the case of the red band, the pause will be 2.3 mS ({[75 degrees–50 degrees]/180 degrees}*16.7 mS). In the case of the green band, the pause will be 0.46 mS ({[55 degrees–50 degrees]/180 degrees}*16.7 mS). The instant of time t in which the last line is being addressed with red data and the blue band has just passed off the LCD panel is shown in FIG. 3. It will be appreciated that the addressing of the first line with green data must wait 2.3 mS until the green band has reached the upper edge of the panel 10.

During the periods in which the electronics are paused, the panel 10 has red (or green) data on every pixel, and every pixel is illuminated with red (or green) light. Thus, the total time of red (or green) field illumination is increased relative to blue, and since brightness equals intensity times time, the brightness of these fields is also increased.

However, there is the opportunity for additional control of color correction, using a pulsed light source. If the amount of red (or green) illumination in the arrangement of FIGS. 2 and 3 is still too low, the lamp can be pulsed to a higher level of illumination during the pauses in addressing in which the panel 10 is substantially entirely illuminated by the red (or green) color. Conversely, if there is too much red (or green), the lamp can be run at reduced power during this period. This affords the opportunity to choose the sizes of the color segments on the drum to achieve a nominal white color balance, and to adjust the color balance further on either side of nominal be varying the level of illumination during the red (or green) pause as described above. of course, a more rapid addressing could be adopted, so that there is a pause in addressing for blue as well as for red and green, thus affording the opportunity for directly adjusting the level of illumination for each color.

This combination of different size color bands and varying illumination levels is advantageous in that it enables electronic adjustment of color balance around a nominal value, allowing custom settings of color balance for each projector.

In addition to RGB color systems, RGBW (red, green, blue, white) projection systems are known. The purpose of the white segment is to increase the white light lumen throughput by 35–50 percent as compared to an RGB system.

In a RGBW system with four equal segments in the color drum, and a 480 line, 60 Hz field, the time allocated to address each line would be: 16.7 mS/4*480=8.7 mS. The total white light lumen throughput would increase by 50 percent over an RGB system. The peak white would be produced 50 percent by the white segment and 50 percent by the sum of the red, blue and green segments.

There are two problems with this fixed allocation. First, the white provided by the sum of the red, blue and green segments may not match the white provided by the white segment. Second, it has been reported that when more than 33 percent of the luminance in a RGBW video system comes from the white segment, desaturated colors appear excessively desaturated.

The solution to both of these problems is to speed up the addressing, for example, to 6 uS per line. For a 480 line field, each color field can be addressed in 480*6 uS=2.9 mS. With equal segment sizes, the total amount of time available per color is 16.7 mS/4=4.2 mS per color. The extra 1.3 mS represents time when only one color and its corresponding display data is on the panel. Therefor, during this time the light source can be driven at higher or lower than nominal power. For example, if equal segments results in too much white light from the white segment, a lamp having a recommended average power of 100 Watts can be driven at 10 Watts instead of 100 Watts during the extra 1.3 mS for white, and at 109.9 Watts for the remainder of the time to give an average power of 100 Watts. In this case, 43 percent of the white light will come from the white segment, and 57 percent from the RGB segments, and the total white light lumen throughput will be 140 percent of that of an RGB system.

If further reduction in white is desired, the lamp can be driven to 300 Watts during the extra 1.3 mS periods for red, green and blue, while driving the lamp at 10 Watts during the 1.3 mS period for white. In this case, 22 percent of the white will come from the white segment and 78 percent from the RGB segments. The total white light lumen throughput will be 117 percent of that for an RGB system. While there is a minimal gain in white throughput in this example, there is also a minimal effect on the desaturated colors.

Conversely, the 1.3 mS parts of the RGB segments can be driven at 10 Watts, and the 1.3 mS part of the white segment can be driven at 300 Watts. In this example, the total throughput will be 183 percent of that of an RGB system. While there will be a significant impact on the desaturated colors, for some applications this will be less important than the increased brightness. In this nearly monochrome mode, 68 percent of the white light will come from the white segment, while 32 percent will come from the RGB segments.

The above examples demonstrate the capability of the invention to trade off system throughput for color purity. This capability can either be incorported as fixed setting at the factory, or can be made adjustable, and thereby placed under the control of a projector operator. For example, if the projector is to be used in a relatively bright conference room showing datagraphic types of information, white light from the white segment could be increased to increase brightness and contrast of the display. In a dimly lit room where video information is to be displayed, the white light from the white segment could be decreased to preserve color purity. It should be readily apparent that the red, green, blue and white segments need not be of equal size. They can be apportioned to achieve a nominal white, as described above for the RGB system. Lamp pulsing can then be employed to fine-tune the color balance and to re-apportion the white brightness between the W, R, G and B segments. Both functions can be done remotely by a projector operator.

The invention has been described in terms of a limited number of embodiments. Other embodiments, variations of embodiments and art-recognized equivalents will become apparent to those skilled in the art, and are intended to be encompassed within the scope of the invention, as set forth in the appended claims.

What I claim as my invention and desire to protect by Letters Patent is:

1. A method of color correction for a single panel scrolling raster color projection system, the system having a single white light source, a single light valve panel, an element for separating the white light into two or more scrolling color bands, and a field-sequential, line-at-a-time addressing system, the method comprising the steps of:

(a) setting the height in the scrolling direction of at least one of the color band(s) to be greater than the height of the panel in the scrolling direction, and setting the height of the remaining color bands to be at least substantially the same as the height of panel in the scrolling direction, so that the panel is substantially entirely illuminated by each color band at some instant of time during scrolling; and (b) changing the power to the light source to increase or decrease the lumen output of the light source during the time period in which the panel is substantially entirely illuminated by a color band, thereby to increase or decrease the contribution of the color of the color band to the total lumen output of the system.

2. The method of claim 1 in which additional color correction is achieved by adjusting the heights in the scrolling direction of one or more of the color band(s) relative to the other color band(s), thereby to increase or decrease the contribution of the color of the changed color band(s) to the total lumen output of the system.

3. The method of claim 1 in which there are at least three color bands, a red band, a green band and a blue band.

4. The method of claim 3 in which the light source is red deficient, the height of the red band is set to be greater than the height of the panel in the scrolling direction, and the power of the light source is increased during the period of time in which the red band substantially entirely illuminates the panel.

5. The method of claim 3 in which there is a fourth, white color band.

6. The method of claim 5 in which the height of the white band is set to be greater than the height of the panel in the scrolling direction, and the power of the light source is decreased during the period of time in which the white band substantially entirely illuminates the panel.

7. The method of claim 1 in which the light valve panel is a reflective active-matrix LCD panel.

8. The method of claim 1 in which the element is a rotatable reflective color drum.

9. A method of color correction for a single panel scrolling raster color projection system, the system having a single white light source, a single light valve panel, an element for separating the white light into two or more scrolling color bands, and a field-sequential, line-at-a-time addressing system, the method comprising the steps of:

(a) setting the height in the scrolling direction of at least one of the color band(s) to be greater than the height of the panel in the scrolling direction, and setting the height of the remaining color bands to be at least substantially the same as the height of panel in the scrolling direction, so that the panel is substantially entirely illuminated by each color band at some instant of time during scrolling; and (b) adjusting the heights in the scrolling direction of one or more of the color band(s) relative to the other color band(s), thereby to increase or decrease the contribution of the color of the changed color band(s) to the total lumen output of the system.

10. The method of claim 9 in which additional color correction is achieved by changing the power to the light source to increase or decrease the lumen output of the light source during the time period in which the panel is substantially entirely illuminated by a color band having a height greater than the height of the panel in the scrolling direction, thereby to increase or decrease the contribution of the color of the color band to the total lumen output of the system.

11. The method of claim 10 in which there are at least three color bands, a red band, a green band and a blue band.

12. The method of claim 11 in which the light source is red deficient, the height of the red band is set to be greater than the height of the panel in the scrolling direction, and the power of the light source is increased during the period of time in which the red band substantially entirely illuminates the panel.

13. The method of claim 11 in which there is a fourth, white color band.

14. The method of claim 13 in which the height of the white band is set to be greater than the height of the panel in the scrolling direction, and the power of the light source is decreased during the period of time in which the white band substantially entirely illuminates the panel.

15. The method of claim 9 in which the light valve panel is a reflective active-matrix LCD panel.

16. The method of claim 9 in which the element is a rotatable reflective color drum.

* * * * *